3,108,989
POLYMERIC PRODUCT OF A PN RING CONTAINING POLYMER AND A CARBOXYLATED DIENE POLYMER AND ARTICLES PREPARED THEREFROM
Rip G. Rice, Buell H. Geib, Lloyd A. Kaplan, and James R. Hooker, all of San Diego, Calif., assignors to General Dynamics Corporation (Convair Division), San Diego, Calif., a corporation of Delaware
No Drawing. Filed June 20, 1960, Ser. No. 37,051
13 Claims. (Cl. 260—45.5)

This invention relates to polymeric compositions useful as coating, adhesive and laminating compositons, and is particularly concerned with production of such compositions from a certain class of condensation products in the form of adducts of phosphonitrilic halides and polyhydroxy aromatic compounds.

The production of a novel class of adducts of cyclic phosphonitrilic halides, particularly the chloride, with polyfunctional compounds, particularly polyhydroxy aromatic compounds such as hydroquinone, is described in the copending applications of Rice and Riley, Serial Nos. 820,573 and 820,574, filed June 16, 1959, now abandoned, and Rice and Riley, Serial Nos. 31,813 and 31,814, filed May 26, 1960.

It is an object of this invention to produce a novel group of polymeric materials based on the aforementioned adducts of cyclic phosphonitrilic halides and polyhydroxy aromatic compounds.

Another object is the provision of polymeric compositions composed of such adducts and certain elastomers, to produce a material which is particularly useful as a coating, as an adhesive or as a bonding material for laminated structures.

Still another object is to provide an article of manufacture in the form of a material coated with a polymeric composition composed of a phosphonitrilic-polyhydroxy aromatic adduct and certain elastomers.

A still further object is the provision of a textile impregnated with a polymeric composition composed of a phosphonitrilic-polyhydroxy aromatic adduct and certain elastomers.

Yet another object is to afford an electrical insulation tape impregnated with the aforementioned polymeric compositions produced from a cyclic phosphonitrilic-hydroquinone adduct and a synthetic rubber of a specific nature.

A still further object is the provision of procedure for producing the above polymeric compositions and the articles coated with such compositions.

Other objects and advantages will appear hereinafter.

It has been found that particularly useful and versatile polymeric compositions having a variety of applications can be formed by mixing or reacting (1) an adduct of a cyclic phosphonitrilic halide, especially the trimeric or tetrameric phosphonitrilic chloride, and a polyhydroxy aromatic compound, preferably hydroquinone, with (2) a carboxylated butadiene-acrylonitrile rubber. A mixture of the two reactants can be dissolved in an organic solvent and the solution applied to a surface, such as a textile. On heating and curing the composition, a protective and adhesive coating is produced which has high temperature resistance properties, good electrical insulation properties, is flexible and is inert to chemicals. Such coating can also serve to bond two or more layers of sheets of material together in the form of a laminate.

The adducts employed in producing the compositions of the invention are obtained as described in the above copending applications, by reaction of a cyclic phosphonitrilic halide such as bromide or chloride, preferably the trimeric or tetrameric phosphonitrilic chloride or mixtures thereof (e.g. a mixture of about 75% trimer and about 25% tetramer by weight), with a polyhydroxy aromatic compound having two or more hydroxy groups such as hydroquinone, phloroglucinol, pyrogallol, catechol and resorcinol. The preferred polyhydroxy aromatic compound is hydroquinone.

The condensation reaction for producing the above noted adducts is carried out in the presence of a hydrogen halide acceptor, e.g. an HCl, acceptor where a phosphonitrilic chloride is employed, for removal of all or a major portion of the halogen or chlorine atoms of the phosphonitrilic chloride. The preferred acceptors for this purpose are heterocyclic tertiary amines, including the picolines and particularly pyridine itself. The reaction is also carried out preferably in a solvent medium. Such solvent can be a homogeneous solvent in which the reactants and the HCl acceptor are all soluble, or a heterogeneous solvent in which the phosphonitrilic chloride and the HCl acceptor are soluble but in which the polyhydroxy aromatic compound, for example hydroquinone, is insoluble. Examples of homogeneous solvents include ethers such as dioxane, and nitriles, and examples of heterogeneous solvents include aliphatic and aromatic hydrocarbons such as hexane and benzene, and chlorinated hydrocarbons such as carbon tetrachloride.

In preferred practice the amount of polyhydroxy aromatic material employed is at least 2 mols per mol $PNCl_2$ in the phosphonitrilic chloride, and the amount of HCl acceptor employed is sufficient to react with substantially all the HCl formed in the reaction, preferably employing at least 2 mols per mol of $PNCl_2$.

The reaction is a substitution reaction in which most or all of the chlorine atoms of the phosphonitrilic chloride are replaced by residues of the polyhydroxy aromatic compound, and the reaction takes place under conditions including temperature such that the PN-containing rings of the phosphonitrilic chloride starting material are preserved in the final product. The condensation product is in the form of a polymeric chain material containing a plurality of rings designated PN containing rings, or PN rings, and consisting of either or both trimeric ($P_3N_3$) or tetrameric ($P_4N_4$) rings, with adjacent rings linked by one or more residues of the polyhydroxy aromatic compounds, e.g. by one or more aromatic dioxy radicals, in each of which linking residues a hydrogen atom of each of two of the functional hydroxy groups has been removed. The polymer also contains residues of the polyhydroxy aromatic compound in which a hydrogen atom of only one functional hydroxy group has been removed, e.g. aromatic oxy, such as phenoxy, radicals carrying free hydroxy groups, such aromatic oxy radicals being connected to phosphorus atoms. Thus, where hydroquinone is the polyhydroxy aromatic compound, adjacent PN rings are linked by one or more p-phenylenedioxy radicals, and the polymer also contains p-hydroxy phenoxy residues containing free functional hydroxyl groups, within the polymeric chain and at the terminal portions thereof. The linkage of adjacent rings by one or more aromatic dioxy, e.g. p-phenylenedioxy, radicals takes place through adjacent phosphorus atoms on adjacent rings; that is, at least one of such radicals is attached to a pair of adjacent phosphorus atoms on adjacent PN rings. The adducts may contain from 0 to a minor proportion of chlorine, preferably from 0 to about 10% chlorine, depending upon the degree of substitution of the chlorine atoms of the phosphonitrilic chloride starting material by the radicals of the polyhydroxy aromatic compound, the remaining chlorine atoms being linked to some of the phosphorus atoms. The adducts may have a molecular weight of about 1,000 to about 15,000, usually about 1,200 to about 6,000.

More specifically, the above described condensation products or adducts are believed to have a plurality of recurring groups of the formula

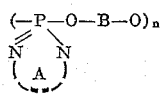

where A represents a member of the group consisting of $P_3N_3$ and $P_4N_4$ rings, B is an aromatic radical, and $n$ is an integer of at least 2, e.g. from 2 to about 15, or more, preferably 2 to 7. The condensation product may contain chlorine, e.g. connected to one or more phosphorus atoms of one or more of the A groups.

The entire description of the process for producing such adducts and the adducts thus produced, as described in the above copending applications, is incorporated herein by reference.

The elastomeric material employed for reaction with the phosphonitrilic adduct described above to produce the polymeric compositions of the invention, is preferably in the nature of a carboxylated butadiene-acrylonitrile rubber, the preparation of which is described in U.S. Patents 2,626,248 and 2,724,707. Such carboxylated copolymers may be formed, for example, by reacting butadiene, acrylonitrile, and acrylic, methacrylic or maleic acid, in proportions of about 55% butadiene, 35% acrylonitrile and 10% of acrylic, methacrylic or maleic acid. See Example 6 of Patent 2,626,248. Hence the copolymer formed contains free carboxyl groups. The preferred carboxylated butadiene-acrylonitrile elastomers employed in producing the invention polymers, may have a molecular weight in the range of about 100,000 to about 150,000. A preferred material of this type is marketed as Hycar 1072.

However, the invention is not limited to use of the aforementioned specific carboxylated butadiene-acrylonitrile rubbers, and any of the elastomeric conjugated diene polymers containing free carboxyl groups described in Patents 2,626,248 and 2,724,707 may be employed in conjunction with the adduct of phosphonitrilic halide and polyhydroxy aromatic compound. Thus, elastomers produced by polymerization of a mixture of a butadiene such as butadiene-1,3, and an olefinically unsaturated carboxylic acid, e.g. an alpha-beta unsaturated carboxylic acid such as maleic or fumaric acid, to form a carboxylated butadiene copolymer, may be employed.

In producing the invention composition, the proportion of the elastomeric material, preferably the proportion of the aforementioned carboxylated butadiene-acrylonitrile rubber, which is employed, is about 100 to about 900% by weight of the phosphonitrilic adduct described above.

In providing the polymeric composition of the invention, e.g. as a coating, the phosphonitrilic adduct and the carboxylated butadiene-acrylonitrile rubber above mentioned are incorporated in a solvent for the two components, such as a ketone, e.g. methyl ethyl ketone or methyl isobutyl ketone, employing an amount of solvent such that the solution has a solids content of about 5 to 25% by weight. The solution thus formed is then applied to the surface of a material which is to be coated such as a textile fabric. The material thus coated is then heated to evaporate the coating vehicle, leaving a fabric carrying a coating of the above composition. The fabric can be used, e.g. as an electrical insulation tape, and the composition cured as described below.

It is believed that some reaction of the phosphonitrilic adduct and the above described rubber takes place in the solution of the two components in the organic solvent. This is believed to be in the nature of an esterification between the carboxylic groups of the rubber and the hydroxyl groups on the aromatic or phenyl radicals of the phosphonitrilic-polyhydroxy aromatic adduct. On heating of the coating composition to about 275° F. such reaction may go to completion, and on further heating to about 350 to about 425° F. it is believed that a reaction of residual P—Cl groups generally present in the adduct and aromatic OH groups takes place, providing a further cross linking. On further heating at more elevated temperatures of the order of about 500° F., a final cure is believed obtained. However, this latter heating step is not necessary to obtain a properly cured coating according to the invention.

Alternatively, the carboxylated butadiene-acrylonitrile polymer can be broken down on a rubber mill in known manner to form a plurality of highly reactive rubber radicals, and the adduct of phosphonitrilic halide and polyhydroxy aromatic compound is added to this rubber on the mill, causing partial linkage to take place between the two materials. The proportions of rubber and adduct employed may be about the same as noted above regarding mixing of the components in an organic solvent. The composition is then applied to the surface of a material to be coated in the form of a solution in an organic solvent such as ketone, and the composition cured by heat as above described.

Examples of practice of the invention are as follows:

*Example 1*

A reaction flask was charged with 500 grams of a mixture of trimeric and tetrameric phosphonitrilic chlorides containing about 75% trimer and about 25% tetramer by weight, 1188 grams of hydroquinone and 7.5 liters of carbon tetrachloride. This mixture was stirred and heated to reflux and then 854 grams of anhydrous pyridine was added, and refluxing and stirring were continued for a period of about 6 hours. When cool, the carbon tetrachloride was removed by decantation, leaving about 2200 ml. of a thick greenish-yellow oil which was a mixture of the adduct of phosphonitrilic chloride and hydroquinone, with impurities. This oil was dissolved in 2 liters of a solution consisting of 80% by volume of acetic acid and 20% by volume of water, and the oil-solvent solution introduced in streams into a relatively large volume of flowing water under conditions to precipitate the adduct of phosphonitrilic chloride and hydroquinone in the form of a flocculent solid, which was filtered out of the mixture and dried. This purification and isolation procedure for the phosphonitrilic-hydroquinone adduct is described in the copending application of Lloyd A. Kaplan, Serial No. 37,466, filed June 20, 1960.

About 200 grams of Hycar 1072, the carboxylated butadiene-acrylonitrile rubber noted above, was dissolved in methyl ethyl ketone using agitation of the solvent. About 100 grams of the above described adduct of phosphonitrilic chloride and hydroquinone, having a molecular weight of about 2400, was added to the solution and the latter agitated at high speed for about 4 hours. The solids content of the solution was reduced to 10% by addition of solvent, and the solution coated on a polyester tape applying about 0.7 mil thickness of coating to the tape per pass, the final coating thickness being between 2 and 15 mils. The solvent was then evaporated.

The coated tape was wrapped around a part for electrically insulating and water proofing the part, the tape being flexible and easily wrapped in this manner. The tape in this condition was then heated for 2 hours at 275° F. and then for 2 hours at 325° F. The coating on the tape was now cured.

The coated tape thus cured was found to have the following properties: (1) one layer of the tape has excellent adhesion to another layer, (2) the tape has excellent adhesion to copper, steel, aluminum, silicone rubber and silicone coatings, (3) the electrical strength, ASTM D-1246, was 600-1,000 volts/mil, (4) there was no noticeable loss of flexibility due to heating of the tape during the curing stage.

The tape was then heated for 8 hours at 400° F. No noticeable loss of flexibility of the tape occurred at the end of this period.

The coating on the tape produced by the cured polymeric composition of the invention accordingly has the properties required of a good electrical tape.

Example 2

A methyl ethyl ketone solvent solution of the phosphonitrilic-hydroquinone adduct produced in Example 1 and the carboxylated butadiene-acrylonitrile rubber of Example 1 was applied to fiber glass tape so as to coat it with about 5 mils of the polymeric composition. The fiber glass tape so coated was wrapped around a hard coil and the assembly was heated for about 2 hours at 275° F. and for 8 hours at 350° F. The so wrapped coil withstood 6000 volts of A.C. current for 20 seconds, and was not affected by immersion for 100 hours in water, oil, aliphatic solvents, aromatic solvents, alcohols or ketones.

Example 3

A solvent solution of the phosphonitrilic-hydroquinone adduct and the carboxylated butadiene-acrylonitrile rubber as described in Example 1 is applied to glass fabric and the solvent dried.

This coated material together with 11 other similarly coated materials are laid up in contact with each other to form a laminate with a coated intermediate layer between adjacent layers of glass fabric. The laminate is then cured by standard vacuum bag or press molding techniques to form a laminate which has high temperature resisting characteristics. The laminate is cured by heating stepwise to temperatures of about 400° F.

Example 4

The procedure of Example 1 is repeated employing in place of the mixture of trimeric and tetrameric phosphonitrilic chlorides, the trimeric phosphonitrilic chloride alone. A polyester tape coated with the polymer so produced has substantially the same properties as the tape described in Example 1.

Example 5

The procedure of Example 1 is repeated except that in place of hydroquinone, catechol is employed in forming the adduct. A tape of the type described in Example 1 coated with the polymeric composition so produced has substantially the same properties as the coated tape described in Example 1.

Example 6

The procedure of Example 1 is repeated employing in place of the rubber noted therein a copolymer of butadiene-1,3 and maleic acid. A tape of the type described in Example 1 coated with this composition has properties similar to the coated tape of Example 1.

From the foregoing it is seen that the polymeric reaction product of the adduct of phosphonitrilic halides and aromatic polyhydroxy compounds, with the elastomers, particularly the carboxylated butadiene-acrylonitrile rubber, described above, is a highly useful material having valuable application in coating, laminating and the adhesive arts.

While we have described particular embodiments of our invention for the purpose of illustration, it should be understood that various modifications and adaptations thereof may be made within the spirit of the invention as set forth in the appended claims.

We claim:

1. A polymeric product which consists essentially of the ester of (1) a condensation product in the form of a polymeric chain containing at least two cyclic PN-containing rings selected from the group consisting of trimeric and tetrameric PN rings, each pair of such adjacent rings being linked together through adjacent phosphorus atoms in adjacent rings by at least one aromatic dioxy radical, said condensation product also containing aromatic oxy radicals containing free hydroxyl groups and less than about 10% chlorine, and (2) an elastomeric conjugated diene polymer containing free carboxyl groups.

2. A polymeric product which consists essentially of the ester of (1) a condensation product in the form of a polymeric chain containing at least two cyclic PN-containing rings selected from the group consisting of trimeric and tetrameric PN rings, each pair of such adjacent rings being linked together through adjacent phosphorus atoms in adjacent rings by at least one aromatic dioxy radical, said condensation product also containing aromatic oxy radicals containing free hydroxyl groups and less than about 10% chlorine, and (2) a copolymer of a butadiene and an olefinically unsaturated carboxylic acid.

3. A polymeric product which consists essentially of the ester of (1) a condensation product in the form of a polymeric chain containing at least two cyclic PN-containing rings selected from the group consisting of trimeric and tetrameric PN rings, each pair of such adjacent rings being linked together through adjacent phosphorus atoms in adjacent rings by at least aromatic dioxy radical, said condensation product also containing aromatic oxy radicals containing free hydroxyl groups and less than about 10% chlorine, and (2) a carboxylated butadiene-acrylonitrile rubber.

4. A polymeric product which consists essentially of the ester of a carboxylated butadiene-acrylonitrile rubber and a condensation product in the form of a polymeric chain containing at least two cyclic PN-containing rings selected from the group consisting of trimeric and tetrameric PN rings, each pair of such adjacent rings being linked together through adjacent phosphorus atoms in adjacent rings by at least one p-phenylene dioxy radical, said condensation product also containing p-hydroxy-phenoxy radicals and less than about 10% chlorine.

5. The process for producing a polymeric product which comprises heating (1) a condensation product in the form of a polymeric chain containing at least two cyclic PN-containing rings selected from the group consisting of trimeric and tetrameric PN rings, each pair of such adjacent rings being linked together through adjacent phosphorus atoms in adjacent rings by at least aromatic dioxy radical, said condensation product also containing aromatic oxy radicals containing free hydroxyl groups and less than about 10% chlorine, and (2) an elastomeric conjugated diene polymer containing free carboxyl groups.

6. The process for producing a polymeric product which comprises heating (1) a condensation product in the form of a polymeric chain containing at least two cyclic PN-containing rings selected from the group consisting of trimeric and tetrameric PN rings, each pair of such adjacent rings being linked together through adjacent phosphorus atoms in adjacent rings by at least one aromatic dioxy radical, said condensation product also containing aromatic oxy radicals containing free hydroxyl groups and less than about 10% chlorine, and (2) a carboxylated butadiene-acrylonitrile rubber.

7. The process for producing a polymeric product which comprises heating (1) a condensation product in the form of a polymeric chain containing at least two cyclic PN-containing rings selected from the group consisting of trimeric and tetrameric PN rings, each pair of such adjacent rings being linked together through adjacent phosphorus atoms in adjacent rings by at least one p-phenylene dioxy radical, said condensation product also containing phenoxy radicals containing free hydroxyl groups and less than about 10% chlorine, and (2) a carboxylated butadiene-acrylonitrile rubber.

8. The process for producing a polymeric product which comprises mixing in an organic solvent a carboxylated butadiene-acrylonitrile rubber and a condensation product in the form of a polymeric chain containing at least two cyclic PN-containing rings selected from the group consisting of trimeric and tetrameric PN rings, each pair of such adjacent rings being linked together through adjacent phosphorus atoms in adjacent rings by at least one p-phenylene dioxy radical, said condensation product also containing p-hydroxy phenoxy radicals and less than about 10% chlorine, evaporating said solvent, and curing said mixture by heating it at elevated temperature.

9. An article of manufacture in the form of an article having a coating thereon comprising the ester of (1) a condensation product in the form of a polymeric chain containing at least two cyclic PN-containing rings selected from the group consisting of trimeric and tetrameric PN rings, each pair of such adjacent rings being linked together through adjacent phosphorus atoms in adjacent rings by at least one aromatic dioxy radical, said condensation product also containing aromatic oxy radicals containing free hydroxyl groups and less than about 10% chlorine, and (2) a carboxylated butadiene-acrylonitrile rubber.

10. An article of manufacture in the form of an article having a coating thereon comprising the ester of (1) a condensation product in the form of a polymeric chain containing at least two cyclic PN-containing rings selected from the group consisting of trimeric and tetrameric PN rings, each pair of such adjacent rings being linked together through adjacent phosphorus atoms in adjacent rings by at least one aromatic dioxy radical, said condensation product also containing aromatic oxy radicals containing free hydroxyl groups and less than about 10% chlorine, and (2) a carboxylated butadiene-acrylonitrile rubber.

11. An article of manufacture in the form of an article having a coating thereon comprising the ester of (1) a condensation product in the form of a polymeric chain containing at least two cyclic PN-containing rings selected from the group consisting of trimeric and tetrameric PN rings, each pair of such adjacent rings being linked together through adjacent phosphorus atoms in adjacent rings by at least one p-phenylene dioxy radical, said condensation product also containing phenoxy radicals containing free hydroxyl groups and less than about 10% chlorine, and (2) a carboxylated butadiene-acrylonitrile rubber.

12. An article of manufacture in the form of a textile fabric impregnated with a polymeric product which consists essentially of the ester of a carboxylated butadiene-acrylonitrile rubber and a condensation product in the form of a polymeric chain containing at least two cyclic PN-containing rings selected from the group consisting of trimeric and tetrameric PN rings, each pair of such adjacent rings being linked together through adjacent phosphorus atoms in adjacent rings by at least one p-phenylene dioxy radical, said condensation product also containing p-hydroxy phenoxy radicals and less than about 10% chlorine.

13. An article of manufacture in the form of a laminate comprising at least two layers of a material bonded together by an intermediate layer of a resin which consists essentially of the ester of (1) a condensation product in the form of a polymeric chain containing at least two cyclic PN-containing rings selected from the group consisting of trimeric and tetrameric PN rings, each pair of such adjacent rings being linked together through adjacent phosphorus atoms in adjacent rings by at least one p-phenylene dioxy radical, said condensation product also containing phenoxy radicals containing free hydroxyl groups and less than about 10% chlorine, and (2) a carboxylated butadiene-acrylonitrile rubber.

References Cited in the file of this patent

UNITED STATES PATENTS

| | | |
|---|---|---|
| 2,214,769 | Lipkin | Sept. 17, 1940 |
| 2,626,248 | Brown | Jan. 10, 1953 |
| 2,866,773 | Redfarn | Dec. 30, 1958 |